United States Patent
Rouet et al.

(10) Patent No.: US 12,450,751 B2
(45) Date of Patent: Oct. 21, 2025

(54) ULTRASOUND DATA SEGMENTATION

(71) Applicant: KONINKLIJKE PHILIPS N.V., Eindhoven (NL)

(72) Inventors: Laurence Rouet, Paris (FR); Haithem Boussaid, Chatenay Malabry (FR); Caroline Denise Francoise Raynaud, Suresnes (FR); Cybele Ciofolo-Veit, Meudon (FR)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 404 days.

(21) Appl. No.: 17/923,016

(22) PCT Filed: Apr. 28, 2021

(86) PCT No.: PCT/EP2021/061038
§ 371 (c)(1),
(2) Date: Nov. 3, 2022

(87) PCT Pub. No.: WO2021/224073
PCT Pub. Date: Nov. 11, 2021

(65) Prior Publication Data
US 2023/0360224 A1    Nov. 9, 2023

(30) Foreign Application Priority Data
May 7, 2020   (EP) .................................... 20290039

(51) Int. Cl.
*G06T 7/149* (2017.01)
*G06T 7/00* (2017.01)

(52) U.S. Cl.
CPC ............ *G06T 7/149* (2017.01); *G06T 7/0012* (2013.01); *G06T 2207/10136* (2013.01)

(58) Field of Classification Search
None
See application file for complete search history.

(56) References Cited

U.S. PATENT DOCUMENTS

| | | |
|---|---|---|
| 2004/0081340 A1 | 4/2004 | Hashimoto |
| 2004/0138560 A1 | 7/2004 | Paladini |

(Continued)

FOREIGN PATENT DOCUMENTS

CN    107909585 A    2/2020

OTHER PUBLICATIONS

Looney PT, et al. 3D ultrasound file reading and coordinate transformations. J Open Source Softw. 2019; 4(33): 1063. doi: 10.21105/joss.01063. Epub Jan. 11, 2019. (Year: 2019).*

(Continued)

*Primary Examiner* — S J Park
*Assistant Examiner* — Caroline E. Depalma (57) ABSTRACT

A method for segmenting a target anatomy in ultrasound data. Scan-converted ultrasound data is obtained within a scan-converted space in the Cartesian coordinate system. The scan-converted ultrasound data is transformed to de-scanned ultrasound data within a de-scanned space in the Toroidal coordinate system. The de-scanned ultrasound data is an estimate of the ultrasound data as obtained by an original acquisition procedure. A segmentation of a target anatomy can thus be performed on the ultrasound data in the de-scanned space The resulting segmentation data can then be re-scanned back to the Cartesian coordinate system for display with the ultrasound data.

11 Claims, 7 Drawing Sheets

(56) References Cited

U.S. PATENT DOCUMENTS

| | | | |
|---|---|---|---|
| 2005/0187474 A1 | 8/2005 | Kwon | |
| 2012/0007863 A1 | 1/2012 | Endo et al. | |
| 2023/0148147 A1* | 5/2023 | Welsh | A61B 8/483 382/131 |

OTHER PUBLICATIONS

Welsh et al. Three-dimensional US Fractional Moving Blood Volume: Validation of Renal Perfusion Quantification. Radiology. Nov. 2019;293(2):460-468. doi: 10.1148/radiol.2019190248. Epub Oct. 1, 2019. (Year: 2019).*

International Search Report and Written Opinion for PCT/EP2021/061038; Mailing date: Jul. 21, 2021, 11 pages.

Lo Vercio, L. et al., "Assessment of image features for vessel wall segmentation in intravascular ultrasound images", Int J Comput Assist Radiol Surg., 2016, vol. 11, pp. 1397-1407.

Toussaint, N. et al., "Weakly Supervised Localisation for Fetal Ultrasound Images", arXiv:1808.00793v1, 2018, 8 pages.

Kasa, L.W. et al., "Direct Scan-Lines Mapping for Ultrasound 3D image Reconstruction", International Journal of Engineering Research & Technology (IJERT), 2013, vol. 2, No. 10, 5 pages.

Lange, T. et al., "Computer Assisted Liver Surgery", Modeling Prior Knowledge for Image Registration in Liver Surgery, Chapter 2, 2011, 36 pages.

Ardon, R. et al., "Fast kidney detection and segmentation with learned kernel convolution and model deformation in 3D ultrasound images", IEEE 12th International Symposium on Biomedical Imaging (ISBI), 2015, pp. 268-271.

Raynaud, C. et al., "Multi-organ Detection in 3D Fetal Ultrasound with Machine Learning", Fetal, Infant and Ophthalmic Medical Image Analysis, 2017, pp. 62-72.

Raynaud, C. et al., "3D deep-learning based organ detection for fetal ultrasound", Online Conference to Unite Philips, 2019.

* cited by examiner

ULTRASOUND DATA SEGMENTATION

CROSS-REFERENCE TO PRIOR APPLICATIONS

This application is the U.S. National Phase application under 35 U.S.C. § 371 of International Application No. PCT/EP2021/061038, filed on Apr. 28, 2021, which claims the benefit of European Patent Application No. 20290039.5, filed on May 7, 2020. These applications are hereby incorporated by reference herein.

FIELD OF THE INVENTION

This invention relates to a method for improving ultrasound imaging. In particular, it relates to anatomy segmentation in ultrasound data.

BACKGROUND OF THE INVENTION

Image segmentation is used in digital image processing for partitioning a digital image or volume into multiple segments (e.g. groups of pixels/voxels), each covering a region of the image or volume. The different segments are typically identified and distinguished based on similar shared graphical properties of the pixels/voxels contained in that segmented region, e.g. color, intensity, or texture.

In the field of medical imaging, segmentation is valuable for identifying various anatomical structures or features such as organs, air and fluid passageways (e.g. blood vessels or digestive passages), valves, or chambers. The resulting contours of the segments enable more rapid assessment of medical images or volumes by clinicians (enabling quicker diagnosis or treatment decisions). The segmentation can also be useful for feeding in to subsequent processing techniques.

One important field of medical imaging is ultrasound imaging. Ultrasound imaging plays an important role in assessment and diagnosis for a wide range of areas of the body. Diagnosis, treatment and planning are often based on utilizing a clear delineation of relevant anatomical sites or features within ultrasound images and segmentation may be used to automate this delineation process.

Automatic segmentation and quantification of organs from 3D ultrasound volumes is an active field of research, but has not yet reached clinical routine. Some methods have been proposed, such as classification techniques or use of landmark-based approaches. However these methods often are not precise and typically contain segmentation leaks.

Automatic segmentation of 3D organs from 3D ultrasound arrays suffers from a main problem related to image acquisition. The acquired volumes are stored in rectangular volumes but contain information only within so-called cone shapes. This results in an inefficient representation of the target anatomies.

More precisely, acquisition methods of ultrasound data have the following disadvantages, which have consequences on the training of automated segmentation algorithms, especially when they involve deep learning:

(i) Non-efficient use of memory, as data outside the cone shapes must also be stored. Using current AI techniques for segmentation, the memory space is a key factor of success. In some acquired ultrasound volumes, up to 60% of voxels are black and represent no information (they are outside of the cone-shaped beam coverage).

(ii) There is learning bias due to the position of the acquisition cone borders.

(iii) Data augmentation requires complicated transformations. Data augmentation is an essential ingredient for deep learning to reach a high performance. In fact, deep learning requires a large and rich training dataset to enable application to new images and avoid overfitting. In the absence of a big dataset, an established technique is to apply geometric/grayscale transformation to the training dataset to generate more training images. To mimic the possible presence of an organ in other locations of the image while preserving the realistic aspect of the image including the cone shape, a complicated transformation needs to be carefully applied in the Cartesian domain. In traditional image processing approaches, a mask can be used to ignore out-of-cone information, but this is not feasible using new techniques of segmentation involving deep learning.

Therefore, a method for overcoming these acquisition disadvantages, with the final objective to train automatic segmentation algorithms in ultrasound imaging, is needed.

CN 107909585 discloses a segmentation method for an inner membrane in a blood vessel of an intravascular ultrasound image.

Lo Vercio, Lucas et al: "Assessment of image features for vessel wall segmentation in intravascular ultrasound images", International Journal of Computer Assisted Radiology and Surgery, vol. 11, no. 8 pp. 1397-1407 (XP036013989), discloses a method for segmenting a vessel wall from intravascular ultrasound images.

Nicolas Toussaint et al: "Weakly supervised localization for fetal ultrasound images", Arxiv.org. Cornell University Library (XP080901171), discloses a method for detecting and localizing fetal anatomical regions in 2D ultrasound images.

SUMMARY OF THE INVENTION

The invention is defined by the claims.

According to examples in accordance with an aspect of the invention, there is provided a method for segmenting a target anatomy in 3D ultrasound volumes, the method comprising:

obtaining a scan-converted ultrasound volume within a scan-converted space in the Cartesian coordinate system:

transforming the scan-converted ultrasound volume to a de-scanned ultrasound volume within a de-scanned space in the Toroidal coordinate system, wherein the de-scanned ultrasound volume comprises an estimate of the ultrasound volume as obtained by an original acquisition procedure; and performing a segmentation of a target anatomy on the ultrasound volume in the de-scanned space to generate segmentation data.

Ultrasound volumes typically contain "empty" data which has no meaningful information. Ultrasound images used to generate ultrasound volumes are typically represented as cone shapes when obtained with phased arrays or curved arrays, however they are displayed on rectangular (or square) screens. Thus, a large proportion of the pixels (or voxels for the 3D volumes) are empty and contain no meaningful information.

The de-scanned space represents the data size needed to store the scan-converted ultrasound volume in the initial coordinate system. For example, in Cartesian coordinates, the data for an image may be stored in a matrix, wherein each matrix element represents the color of a pixel in RGB. However, for scan-converted ultrasound images, the meaningful data is in a conical shape due to the acquisition of the ultrasound volume, thus a proportion of the data stored in the matrix (for a scan-converted ultrasound image) is empty data.

The ultrasound volume is obtained in the scan-converted space (e.g. a cube including the cone of ultrasound volume) in the Cartesian coordinate space with empty data. It is obtained in the Cartesian coordinate system as it represents how the image would be seen in real life, and is thus more intuitive to a clinician.

However, due to the empty data, a segmentation algorithm may give more weight to the shape of the cone and areas with empty data instead of segmenting the target anatomy during training. Thus, the scan-converted ultrasound volume is "de-scanned", which relates to performing an inverse scan conversion on the scan-converted ultrasound volume. This is done by transforming the scan-converted ultrasound volume to the Toroidal coordinate system (which may thus be considered to be the de-scanned coordinate system) which represents how the ultrasound volume was acquired. By transforming the scan-converted ultrasound volume to a coordinate system which represents how it was captured, it may significantly reduce the proportion of empty data.

A segmentation algorithm can then be trained and applied to the de-scanned ultrasound volume in the de-scanned space with more accuracy and precision than in the acquisition space.

The segmentation method is for example based on a convolutional neural network. The de-scan conversion method improves the convolutional neural network based segmentation method through efficient use of memory.

The method may further comprise transforming the de-scanned ultrasound volume in the de-scanned space back to the scan-converted space after the segmentation has been performed.

Once the de-scanned ultrasound volume is segmented for the target anatomy (e.g. kidney, fetus etc.), the segmentation data (in the de-scanned space) can be transformed back to the Cartesian coordinate system such that it can be overlaid on the initial image. The transformation of the segmentation thus provides a visualization of the segmented parts with the correct Cartesian geometry. This way, the clinician can analyze the ultrasound volume with no warping, with the added benefit that the data has now been segmented (e.g. to calculate the area/volume of the segmented target anatomy).

The method may further comprise displaying one or more of:
  the scan-converted ultrasound volume in the scan-converted space;
  the de-scanned ultrasound volume in the de-scanned space;
  the segmented ultrasound volume in the de-scanned space: or
  the segmented ultrasound volume in the scan-converted space.

The method may further comprise determining the volume of the target anatomy based on the segmentation of the target anatomy.

The de-scanned coordinate system is the Toroidal coordinate system.

The use of the Toroidal coordinate system is used because it best represents the acquisition of the ultrasound volume. For example, on phased array's and curved arrays, the ultrasound probe is rotated around the center of a rotor (i.e. the motor that makes the ultrasound probe rotate) when 3D volumes are captured. Thus, the Toroidal coordinate system provides a lower proportion of empty data.

The method may further comprise estimating the acquisition geometry of the ultrasound volume thereby to derive the transformation for transforming the scan-converted ultrasound volume to a de-scanned ultrasound volume, and wherein estimating the acquisition geometry comprises one or more of:
  estimating an optical center of acquisition;
  estimating a mechanical center of acquisition;
  estimating a minimum depth of acquisition;
  estimating a maximum depth of acquisition;
  estimating an angle of view; and
  estimating an acquisition sweep angle.

In general imaging acquisition, it is likely that the imaging lines of the scan-converted ultrasound volume are not saved with the scan-converted ultrasound volume, thus performing the de-scanning may not be directly possible due to the lack of acquisition geometry needed to perform the transformation. In this case, the acquisition geometry may need to be estimated from the scan-converted ultrasound volume before transforming the scan-converted ultrasound volume to the de-scanned space.

If there are separate optical and mechanical centers, the toroidal transformation results.

The estimations may be obtained by image analysis of the scan-converted ultrasound volume in the Cartesian coordinate system.

The invention also provides a computer program product comprising computer program code means which, when executed on a computing device having a processing system, cause the processing system to perform all of the steps of the method mentioned above.

The invention also provides a system for segmenting a target anatomy in de-scanned ultrasound volumes, the system comprising:
  a processor configured to:
    receive a scan-converted ultrasound volume within a scan-converted space in the Cartesian coordinate system;
    transform the scan-converted ultrasound volume to a de-scanned ultrasound volume within a de-scanned space in the Toroidal coordinate system, wherein the de-scanned ultrasound volume comprises an estimate of the ultrasound volume as obtained by an original acquisition procedure; and perform a segmentation of a target anatomy on the ultrasound volume in the de-scanned space to generate segmentation data.
  The processor may be further configured to transform the segmentation data (in the de-scanned space) back to the scan-converted space after the segmentation has been performed.

The system may further comprise a display for displaying one or more of:
  the ultrasound volume in the scan-converted space;
  the ultrasound volume in the de-scanned space;
  the segmented ultrasound volume in the de-scanned space: or
  the segmented ultrasound volume in the scan-converted space.

The processor may be further configured to determine the volume of the target anatomy based on the segmentation of the target anatomy.

The de-scanned coordinate system is the Toroidal coordinate system.

The processor may be configured to transform the ultrasound volume to a de-scanned space within the Toroidal coordinate system by estimating the acquisition geometry of the ultrasound volume thereby to derive the transformation for transforming the scan-converted ultrasound volume to a de-scanned ultrasound volume, and wherein the processor is configured to estimate the acquisition geometry based on one or more of:

estimating an optical center of acquisition;
estimating a mechanical center of acquisition;
estimating a minimum depth of acquisition;
estimating a maximum depth of acquisition;
estimating an angle of view; and
estimating an acquisition sweep angle.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides a method for segmenting a target anatomy in ultrasound data. Scan-converted ultrasound data is obtained within a scan-converted space in the Cartesian coordinate system. The scan-converted ultrasound data is transformed to de-scanned ultrasound data within a de-scanned space in the Toroidal coordinate system. The de-scanned ultrasound data is an estimate of the ultrasound data as obtained by an original acquisition procedure. A segmentation of a target anatomy can thus be performed on the ultrasound data in the de-scanned space. The resulting segmentation data can then be re-scanned back to the Cartesian coordinate system for display with the ultrasound data.

Figure 1:
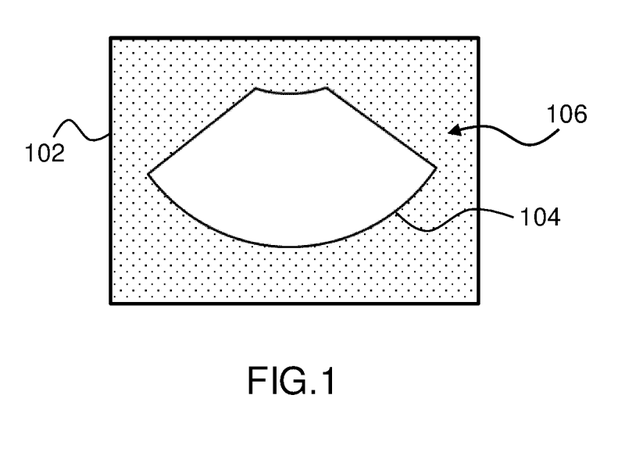
FIG. 1 shows an ultrasound image in a rectangular scan-converted space.

FIG. 1 shows scan-converted ultrasound data 102 in a rectangular scan-converted space. Scan lines are typically used to create viewable ultrasound data 102 (e.g. images or volumes) from raw data based on how the ultrasound data 102 was acquired (based on the acquisition procedure) which allows the data to be visualized in a true Cartesian domain where distances and angles are measurable. Thus, the raw data captured by an ultrasound probe is scan-converted with help of the scan lines to Cartesian coordinates to provide a "real life" view of the ultrasound data. Additionally, the scan-converted ultrasound data 102 is typically stored in the scan-converted space (in Cartesian coordinates) and any analysis or data processing performed post-acquisition must typically be done in the scan-converted space.

Scan-converted ultrasound data 102 in Cartesian coordinates typically contains meaningful data 104 in a cone-like shape surrounded by "empty" (or meaningless) data 106. Even though a significant proportion of the scan-converted ultrasound data 102 does not contain meaningful data 104, all of the scan-converted space needs to be stored due to the nature of image data storage (typically a bitmap of image) in the Cartesian coordinates.

3D scan-converted ultrasound volumes typically contain significant proportions of empty data 106 (black voxels) which are not required for clinical information but are required for the scan-converted ultrasound volume to be stored in Cartesian coordinates.

Figure 2:
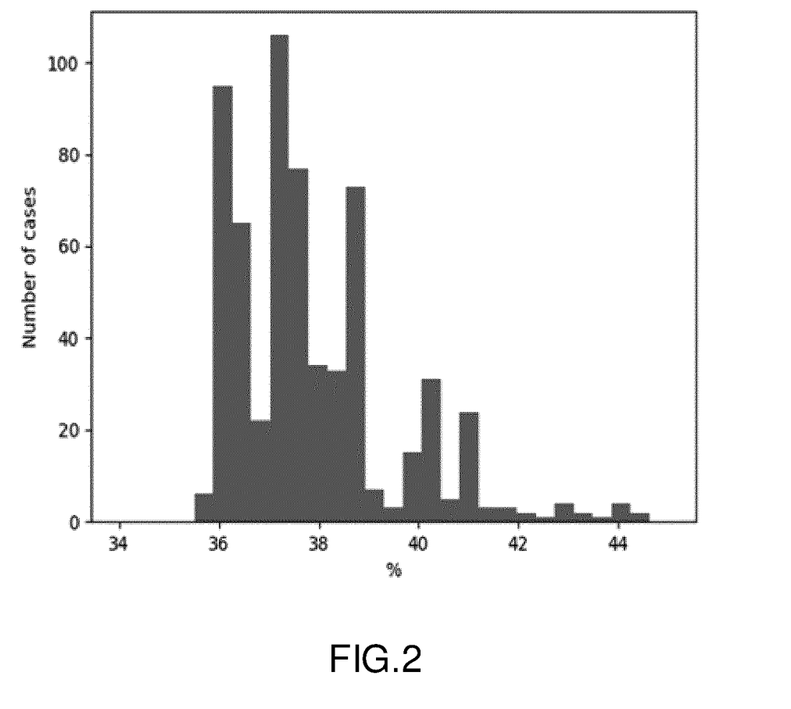
FIG. 2 shows a histogram of the percentage of meaningful data in a large database of volumetric kidney acquisitions.

FIG. 2 shows a histogram of the percentage of meaningful data 104 in a large database of volumetric kidney acquisitions. The large database of volumetric kidney acquisitions contained 621 volumes. The ratio of the volume within the imaging cone (meaningful data 104) over the whole Cartesian volume was calculated for each volumetric kidney acquisition (in percentage %).

The x-axis shows the ratio (in percentage % and in steps of 0.4%) of the meaningful data 104 to the total data stored in the scan-converted space. The y-axis shows the number of cases for each ratio range.

As can be seen, the range of ratios is from 35.6% to 44.8% with the average ratio of meaningful data 104 being around 38%. Thus, the proportion of empty data 106 in the volumetric kidney acquisitions (which is only required for storing the data in Cartesian coordinates) is around 62%.

This means that an average of 62% of all of the data stored (for volumetric kidney acquisitions) is, in essence, wasted storage space. Data compression may be used to make the data storage more efficient, but for use with a deep learning algorithm the voxels will require memory storage. Additionally, any machine learning algorithm (e.g. segmentation algorithm) which is trained with this data will place an unjustified high importance on the empty data 106 due to the high proportion of empty data 106 in the an converted ultrasound data 102.

Figure 3:
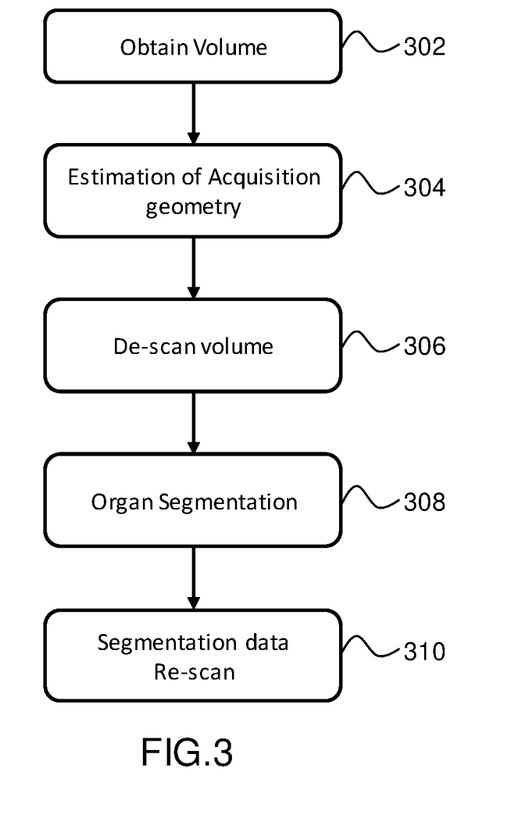
FIG. 3 shows a flow diagram of the method for performing a segmentation.

FIG. 3 shows a flow diagram of the method for performing a segmentation on 3D ultrasound volumes. Once a 3D ultrasound volume is obtained, step 302, an acquisition geometry can be estimated, step 304, if it is not known. The acquisition geometry may include estimating the scan lines of the ultrasound data and finding the optical center and mechanical center of the acquisition process.

Estimating the acquisition geometry, step 304, is based on estimating how the ultrasound data was acquired. For example, if an ultrasound volume was obtained with a phased array ultrasound probe rotated around the skin of a subject, the ultrasound volume will have a minimum depth and a maximum depth (relative to the ultrasound transducer array), an optical center (where the ultrasound transducers reside), a mechanical center (where the rotor of the ultrasound probe resides), an angle of view (based on the angle of an ultrasound image obtained by the ultrasound probe) and an angle of sweep (based on the rotation of the ultrasound probe around the skin by the rotor of the ultrasound probe). These quantities of acquisition geometry can be estimated from the ultrasound volume. With the acquisition geometry, the volume can be "de-scanned", step 306.

De-scanning is the process of "un-doing" the scan conversion process, in order to get rid of as much empty data as possible. This can be done by choosing a coordinate system which simulates the acquisition process. The Toroidal coordinate system is a good approximation, as it requires two centers (equating to the optical center and mechanical 20) center of the acquisition in ultrasound imaging).

Once the volume is de-scanned, a segmentation algorithm can be applied, step 308, to the volume in order to segment a target anatomy. Working in the Toroidal coordinate system for the segmentation process is more powerful than other coordinate systems and provides better performance of the automatic segmentation. The target anatomy may include one or more of organs, blood vessels, heart chambers, bones, muscles etc.

The segmentation algorithm would have also been trained with de-scanned volumes. The segmentation data can then be returned to the Cartesian coordinate system (re-scanned), step 310, such that viewing the volume (e.g. on a display) is more intuitive for a clinician. The original volume is for example shown with the segmentation data having been 30) re-scanned. Optionally, the image data of the original volume could be re-scanned together with the segmentation data, but it is preferred to use the original image data (without de-scanning and re-scanning).

Figure 4:
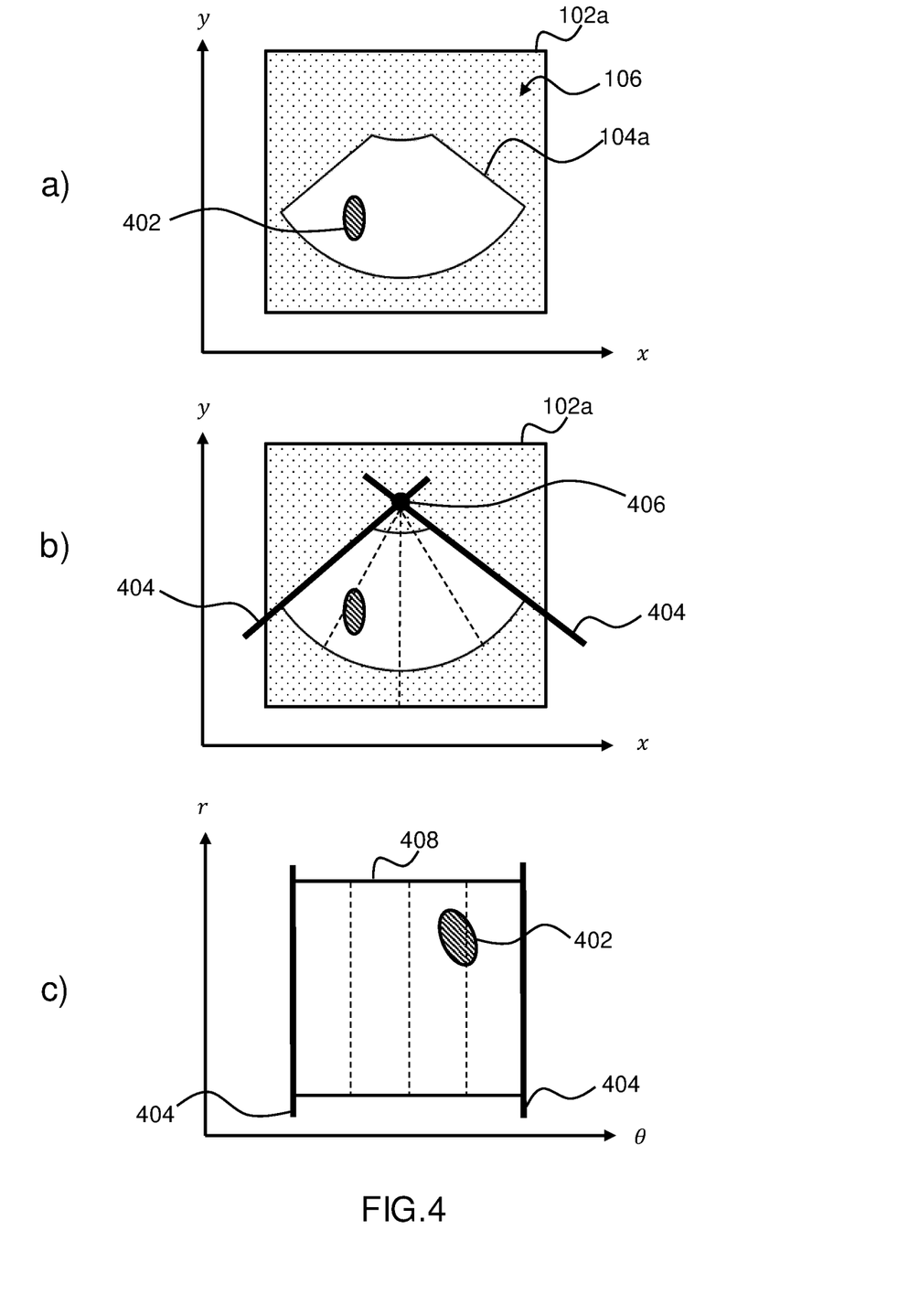
FIG. 4 shows an ultrasound volume transformed to polar coordinates.

FIG. 4 shows an example of how a scan-converted ultrasound image 102a may be de-scanned for the purposes of illustrating the general steps. 2D Ultrasound images are used in this example instead of ultrasound volumes in order to simplify the example, whilst showing the de-scanning steps.

FIG. 4 a) shows the scan-converted ultrasound image 102a in Cartesian coordinates. The empty data 106 is needed in order to store the meaningful image 104a in a rectangular format, such as in a bitmap. A target anatomy 402 is shown to aid in explaining how the de-scan process works.

FIG. 4 b) shows the scan-converted ultrasound image 102a interpolated with imaging lines 404. It may be that the imaging lines 404 are stored with the scan-converted ultrasound image 102a. However, in most cases, stored scan-converted ultrasound data 102 does not contain data on the imaging lines 404. In this case, the imaging lines 404 can be estimated from the scan-converted ultrasound images 102a. Two imaging lines 404 can be estimated from the side edges from the scan-converted ultrasound image 102a. From these imaging lines 404, an optical center 406 can be estimated and further imaging lines 404 may be constructed. An angle of view can also be estimated from the imaging lines 404 as the angle between the two furthest imaging lines 404 determined at the edges.

FIG. 4 c) shows a de-scanned ultrasound image 408 in polar coordinates (again because a simplified 2D image is used as an example). Thus, the the radial component is based on the distance of each data point from the optical center 406 found in FIG. 4 b). The angular component of each data point can also be found by measuring the angle between an imaging line containing the data point and an edge imaging line for the scan-converted ultrasound image 102a in the Cartesian coordinates. As can be seen, there is no empty data 106 in the de-scanned ultrasound image 408, whilst it can still be stored in rectangular form (e.g. RGB matrix bitmap). Additionally, the target anatomy 402 represents a higher proportion of the overall data (compared to the scan-converted ultrasound image 102a).

Figure 5:
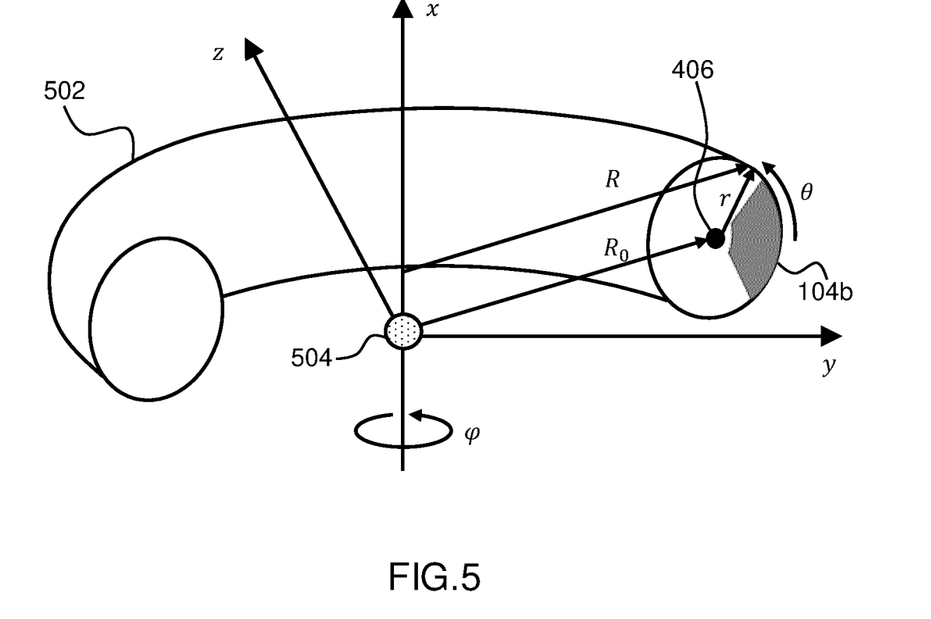
FIG. 5 shows an ultrasound volume in a scan-converted space.

The de-scanned coordinate system used is instead the Toroidal coordinate system. FIG. 5 shows part of a toroid 502 in the Cartesian and Toroidal coordinate systems. The transform is inspired from the acquisition process as it performs a kind of de-scan conversion, which may be seen as a dedicated pre-processing step for a segmentation algorithm. Using the acquisition geometry parameters, a Cartesian to Toroidal transformation 30) can be applied to the scan-converted ultrasound data 102 in order to mimic ultrasound lines that could have generated a similar volume. The Toroidal coordinate system can be used to represent meaningful 3D ultrasound data 104b.

3D ultrasound volumes are typically determined from many 2D ultrasound images. An optical center 406 can be obtained for the 2D ultrasound images (at least two). The optical centers will create a section of circle, and the center of the circle is the mechanical center 504.

Once the mechanical center 504 and optical center 406 are obtained, the distance between them can be calculated $-R_0$. The Cartesian coordinates (x, y, z) can thus be converted to the Toroidal coordinates (r, φ, θ):

$$(r, \varphi, \theta) = \begin{cases} x = r\sin\theta + x_B \\ y = (R_0 + r\cos\theta)\cos\varphi + y_B \\ z = (R_0 + r\cos\theta)\sin\varphi + z_B \end{cases} \quad (1)$$

$$R = R_0 + r\cos\theta \quad (2)$$

Equations (1) and (2) can be used to transform a volume from Cartesian coordinates into Toroidal coordinates. In the acquisition volume, a point is named (x, y, z). In order to find its corresponding intensity at point (r, φ, θ) in the transformed domain, the equations calculate (r, φ, θ) as a function of (x, y, z) where (r, φ,θ)∈[R, Θ, Φ].

[R, Θ, Φ] are the ranges of values of the parameters selected for de-scan. This defines the size of the de-scanned volume that is computed as input to the segmentation training and testing algorithm.

The true values of these parameters are usually not known because there is no storage of the pre-scan conversion data. Thus, there is freedom to set these values. This is an advantage in a learning approach. For example, for a rough and fast algorithm, small values can be selected such as (64,64,64). In practice, larger ranges of values are preferably chosen that can still enable the deep learning algorithm to be trained in memory. It is also possible to define unequal values for these parameters such as (128,128,64). This can reflect the proportional distances in the original acquired volumes.

The de-scan can thus be applied with multiple choices of these parameters. This means that the method can be scaled to the available memory on computers when learning the network for a given organ. At the end of this step, a 3D dataset of dimension (R, Θ, Φ) is obtained, where each voxel carries significant information.

The minimum and maximum value of r can be calculated from the minimum depth and maximum depth of acquisition respectively, the value of θ can be calculated from the angle of view and the value of φ can be calculated from the angle of sweep.

Once the de-scanned ultrasound data 408 has been segmented in the de-scanned space, it can be returned to the scan-converted space in Cartesian coordinates using equations (3) and (4).

$$(x, y, z) = \begin{cases} r = \sqrt{(x - x_B)^2 + (R - R_0)^2} \\ |\theta| = \cos^{-1}\left(\frac{|R - R_0|}{r}\right), \text{sign}(\theta) = \text{sign}(x - x_B) \\ |\varphi| = \cos^{-1}\left(\frac{|y - y_B|}{R}\right), \text{sign}(\varphi) = \text{sign}(z - z_B) \end{cases} \quad (3)$$

$$R = \sqrt{(y - y_B)^2 + (z - z_B)^2} \quad (4)$$

Figure 6:
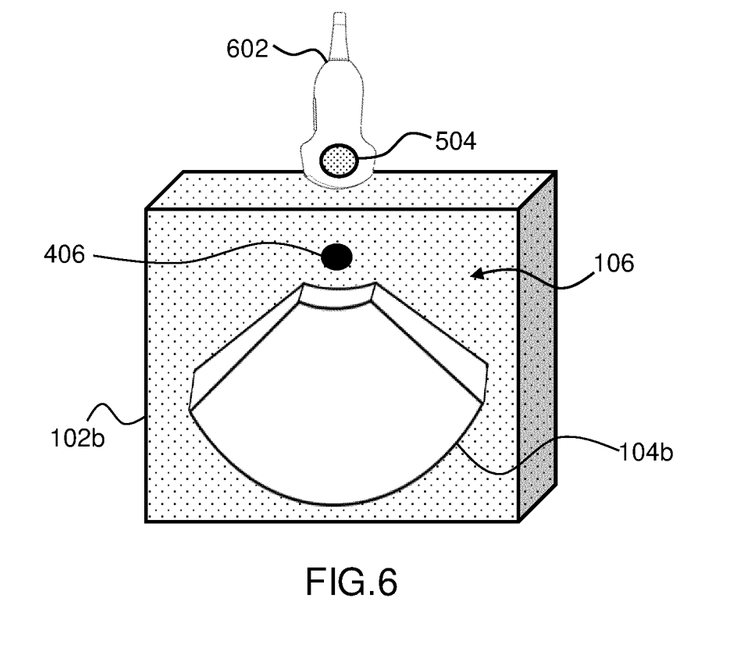
FIG. 6 shows a toroid in the Cartesian and Toroidal coordinate systems.

FIG. 6 shows a scan-converted ultrasound volume 102b in a scan-converted space. The white cone represents meaningful data 104b, while the dotted space represents zero values which do not code any useful information 106. The larger dotted circle outside the scan-converted space represents the mechanical center 504 and the smaller black circle represents the optical center 406 in an A-plane.

Using the meaningful data 104b, the parameters of the acquisition geometry are estimated. They represent: the center of the A-plane imaging beams (optical center 406), the minimum and maximum depth of imaging, the angle of view in A-plane, the center of the sweep for imaging other planes (mechanical center 504), and the corresponding sweep angle.

Figure 7:
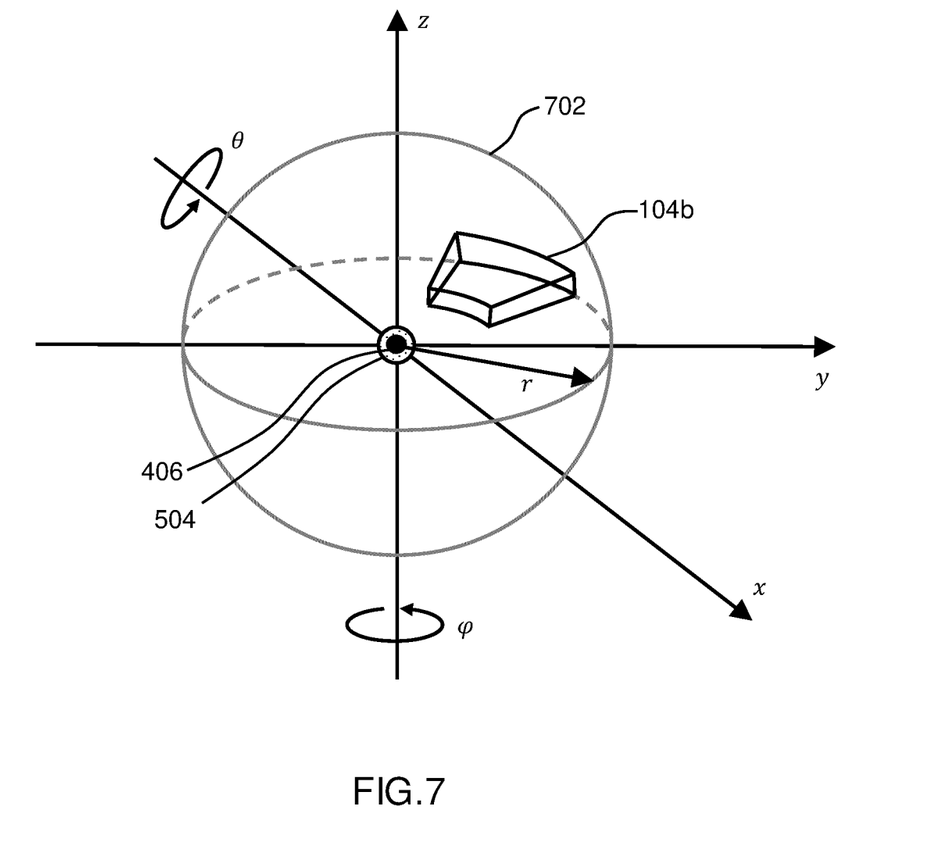
FIG. 7 shows an ultrasound volume in spherical coordinates.

FIG. 7 shows an ultrasound volume 104b in spherical coordinates. The spherical coordinate system is an extreme case of the Toroidal coordinate system for which the optical center 406 and the mechanical center 504 are both at the same place (or can be approximated as being in the same place). The ultrasound volume 104b can in such cases be fully defined in the spherical coordinate system without the need of empty data. However, the use of the spherical coordinate system will not be as accurate as the use of the Toroidal coordinate system due to the (sometimes unrealistic) assumption that the optical center 406 and the mechanical center 504 are in the same place. Thus, the use of the Toroidal coordinate system allows for scanned data with different optical and mechanical centers and is thus able to provide effective operation for a greater variety of initial scan conditions.

Figure 8:
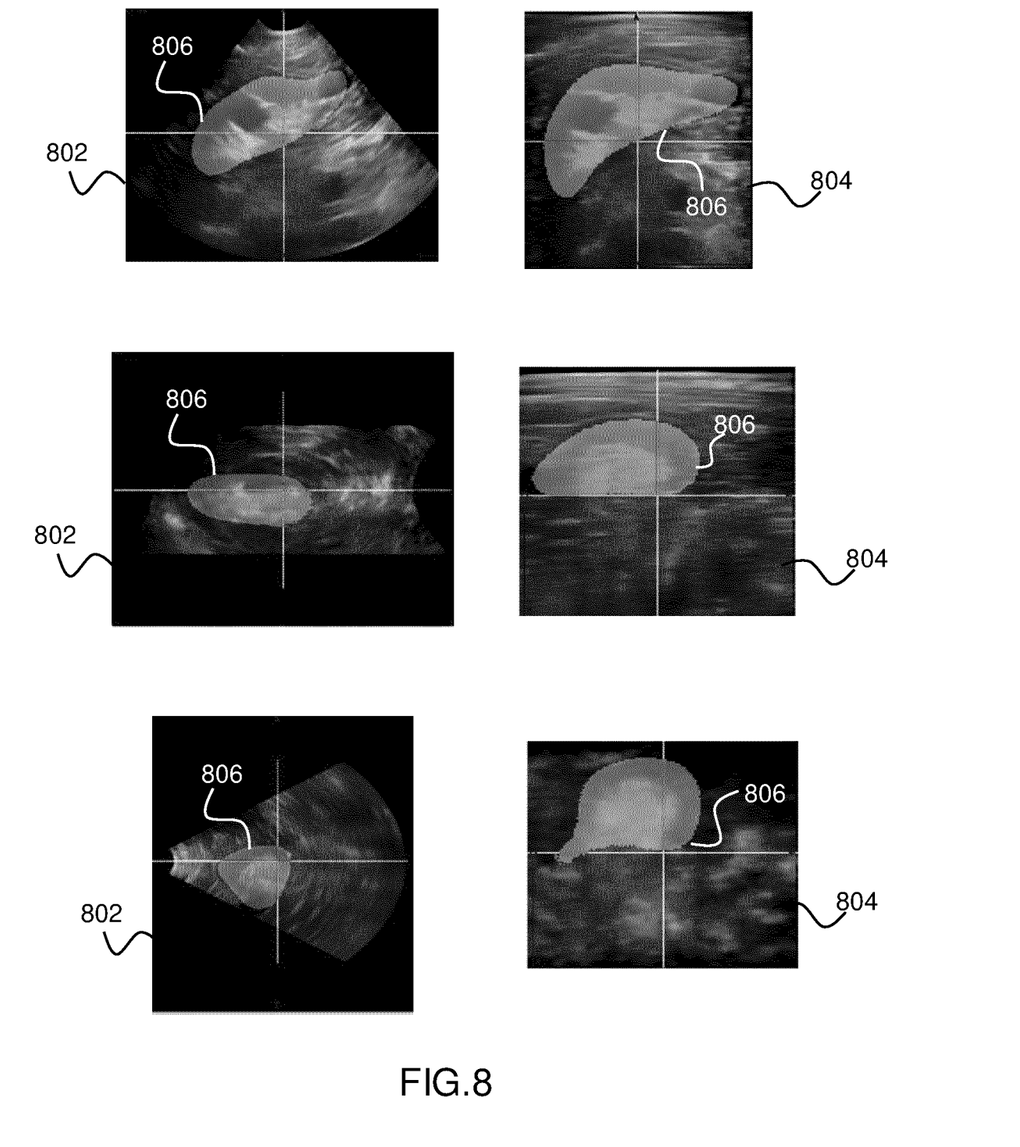
FIG. 8 shows organ segmentations in the de-scanned coordinate system and in the acquisition coordinate system.

FIG. 8 shows organ segmentations 806 in the de-scanned coordinate system and in the acquisition coordinate system. The left hand side images 802 show ultrasound images from an ultrasound volume with kidney segmentations in Cartesian coordinates. The right hand side images 804 show de-scanned ultrasound images from an ultrasound volume after the ultrasound volume has been converted into the Toroidal coordinate system with the corresponding de-scanned segmentations. On the right hand side images 804, the horizontal axis represents the radius r and the vertical axis represents the poloidal angle θ of the Toroidal coordinate system. The de-scanned segmentation is generated for ground-truth segmentations and may be used for network training.

Large quantities of data are needed to train the segmentation algorithm. Data augmentation is a method used to create large quantities of data from an initial small size of data. For example, geometric transformations (e.g. rotations and translations) and color transformations may be used (e.g. grayscale transformation) can be used on a single ultrasound image/volume to create multiple training images.

The de-scanned ultrasound data in the Toroidal coordinate system allows for more intuitive and less error prone geometric transformations to create large databases for training.

Additionally, when training the segmentation algorithm, data biases must be avoided if possible (e.g. shape of data). In scan-converted ultrasound data, the cone shape containing the meaningful data is a source of data bias for the segmentation algorithm. The segmentation algorithm is also trained with the empty (meaningless) data which may cause the segmentation algorithm to ignore certain sections of the data in future segmentations or to look for certain patterns of empty data.

De-scanned ultrasound volumes (e.g. in the Toroidal coordinate system) can be fully described without the need of empty data for storage, thus the data bias due to the empty data is removed.

The algorithm may be any type of standard deep-learning approach such as U-Net segmentation. At the output of segmentation, the segmented ultrasound data may be converted back to the Cartesian coordinate system. The acquisition geometry parameters are re-used in the inverse transformation, in order to convert the segmentation mask from, for example, the Toroidal coordinate system back to the image Cartesian coordinate system.

Figure 9:
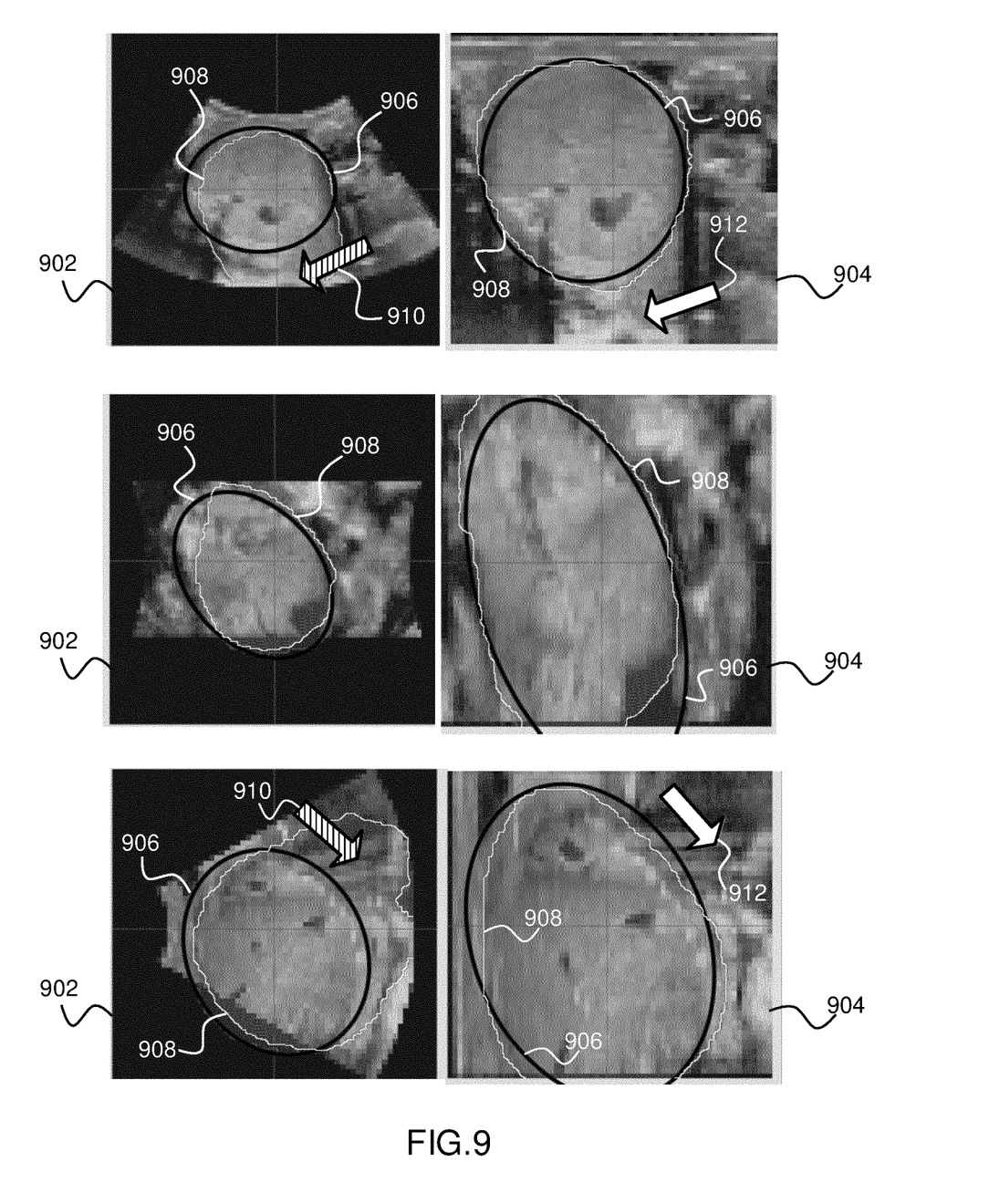
FIG. 9 shows the results of organ segmentation in the Toroidal coordinate system and in the acquisition coordinate system.

FIG. 9 shows the results of organ segmentations 908 in the Toroidal coordinate system 904 and in the Cartesian coordinate system 902. The same cases are shown, segmented without the coordinate transformation on the left hand side images 902, and segmented with the coordinate transformation to the de-scanned domain on the right hand side images 904. Using the de-scanned ultrasound images 904 provides more accurate results. The approximate ground truth 906 is shown in black circles and the segmentation algorithm result 908 are shown by white perimeters. The stripped arrows 910 show segmentation leaks in the results without the de-scan transformation in the scan-converted ultrasound images 902. The corresponding arrows 912 are shown in the images with the de-scan transformation, showing that segmentation leaks are significantly reduced in the de-scanned ultrasound images 904.

The method has also been applied in the domains of fetal abdomen and adult kidney segmentations with success. The results obtained with this method significantly out-perform approaches that do not used the transformation into the toroidal domain. The table below shows the results, showing a significant improvement over conventional segmentation (not using de-scan).

|  | Kidney (69 volumes) | Abdomen (40 volumes) |
|---|---|---|
| Mean Dice in de-scanned images | 0.87 | 0.94 |
| Mean Dice in scan-converted images | 0.83 | 0.83 |

As discussed above, the system makes use of processor to perform the data processing. The processor can be implemented in numerous ways, with software and/or hardware, to perform the various functions required. The processor typically employs one or more microprocessors that may be programmed using software (e.g., microcode) to perform the required functions. The processor may be implemented as a combination of dedicated hardware to perform some functions and one or more programmed microprocessors and associated circuitry to perform other functions.

Examples of circuitry that may be employed in various embodiments of the present disclosure include, but are not limited to, conventional microprocessors, application specific integrated circuits (ASICs), and field-programmable gate arrays (FPGAs).

In various implementations, the processor may be associated with one or more storage media such as volatile and non-volatile computer memory such as RAM, PROM, EPROM, and EEPROM. The storage media may be encoded with one or more programs that, when executed on one or more processors and/or controllers, perform the required functions. Various storage media may be fixed within a processor or controller or may be transportable, such that the one or more programs stored thereon can be loaded into a processor.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality.

A single processor or other unit may fulfill the functions of several items recited in the claims.

The mere fact that certain measures are recited in mutually different dependent claims does not indicate that a combination of these measures cannot be used to advantage.

A computer program may be stored/distributed on a suitable medium, such as an optical storage medium or a solid-state medium supplied together with or as part of other hardware, but may also be distributed in other forms, such as via the Internet or other wired or wireless telecommunication systems.

If the term "adapted to" is used in the claims or description, it is noted the term "adapted to" is intended to be equivalent to the term "configured to".

Any reference signs in the claims should not be construed as limiting the scope.

The invention claimed is:

1. A method for segmenting a target anatomy in a 3D ultrasound volume, the method comprising:
   obtaining a scan-converted ultrasound volume within a scan-converted space in a Cartesian coordinate system;
   transforming the scan-converted ultrasound volume to a de-scanned ultrasound volume within a de-scanned space in a Toroidal coordinate system, wherein the de-scanned ultrasound volume comprises an estimate of the ultrasound volume as obtained by an original acquisition procedure; and
   performing a segmentation of a target anatomy on the ultrasound volume in the de-scanned space to generate segmentation data.

2. The method of claim 1, further comprising transforming the segmentation back to the scan-converted space after the segmentation has been performed.

3. The method of claim 2, further comprising displaying one or more of:
   the ultrasound volume in the scan-converted space;
   the ultrasound volume in the de-scanned space;
   the segmented ultrasound volume in the de-scanned space; or
   the segmented ultrasound volume in the scan-converted space.

4. The method of claim 1, wherein the method further comprises determining the volume of the target anatomy based on the segmentation of the target anatomy.

5. The method of claim 1, further comprising estimating an acquisition geometry of the ultrasound volume thereby to derive the transformation for transforming the scan-converted ultrasound volume to a de-scanned ultrasound volume, and wherein estimating the acquisition geometry comprises one or more of:
   estimating an optical center of acquisition;
   estimating a mechanical center of acquisition;
   estimating a minimum depth of acquisition;
   estimating a maximum depth of acquisition;
   estimating an angle of view; and
   estimating an acquisition sweep angle.

6. A computer program product comprising computer program code means embodied on a non-transitory computer readable medium which, when executed on a computing device having a processing system, cause the processing system to perform all of the steps of the method according to claim 1.

7. A system for segmenting a target anatomy in a 3D ultrasound volume, the system comprising:
   a processor configured to:
      receive a scan-converted ultrasound volume within a scan-converted space in a Cartesian coordinate system;
      transform the scan-converted ultrasound volume to a de-scanned ultrasound volume within a de-scanned space in a Toroidal coordinate system, wherein the de-scanned ultrasound volume comprises an estimate of the ultrasound volume as obtained by an original acquisition procedure; and
      perform a segmentation of a target anatomy on the ultrasound volume in the de-scanned space to generate segmentation data.

8. The system of claim 7, wherein the processor is further configured to transform the segmentation data back to the scan-converted space after the segmentation has been performed.

9. The system of claim 8, further comprising a display for displaying one or more of:
   the ultrasound volume in the scan-converted space;
   the ultrasound volume in the de-scanned space;
   the segmented ultrasound volume in the de-scanned space; or
   the segmented ultrasound volume in the scan-converted space.

10. The system of claim 7, wherein the processor is further configured to determine the volume of the target anatomy based on the segmentation of the target anatomy.

11. The system of claim 7, wherein the processor is configured to transform the ultrasound volume to a de-scanned space within the Toroidal coordinate system by estimating an acquisition geometry of the ultrasound volume thereby to derive the transformation for transforming the scan-converted ultrasound volume to a de-scanned ultrasound volume, and wherein the processor is configured to estimate the acquisition geometry based on one or more of:
   estimating an optical center of acquisition;
   estimating a mechanical center of acquisition;
   estimating a minimum depth of acquisition;
   estimating a maximum depth of acquisition;
   estimating an angle of view; and
   estimating an acquisition sweep angle.

* * * * *